(12) United States Patent
Giannantonio et al.

(10) Patent No.: US 8,289,676 B2
(45) Date of Patent: Oct. 16, 2012

(54) MULTILAYER COMPOSITE GETTER

(75) Inventors: Roberto Giannantonio, Oleggio (IT);
Alessandra Fernicola, Rome (IT);
Paolo Vacca, Rome (IT); Enea Rizzi,
Milan (IT)

(73) Assignee: SAES Getters S.p.A., Lainate (MI) (IT)

( * ) Notice: Subject to any disclaimer, the term of this patent is extended or adjusted under 35 U.S.C. 154(b) by 0 days.

(21) Appl. No.: 13/265,536

(22) PCT Filed: May 19, 2010

(86) PCT No.: PCT/EP2010/056872
§ 371 (c)(1),
(2), (4) Date: Oct. 20, 2011

(87) PCT Pub. No.: WO2010/136364
PCT Pub. Date: Dec. 2, 2010

(65) Prior Publication Data
US 2012/0033348 A1    Feb. 9, 2012

(30) Foreign Application Priority Data

May 25, 2009  (IT) .............................. MI2009A0917

(51) Int. Cl.
*H01G 9/00* (2006.01)
(52) U.S. Cl. ....................................... 361/502; 361/503

(58) Field of Classification Search ........... 361/502–503
See application file for complete search history.

(56) References Cited

U.S. PATENT DOCUMENTS

2009/0215610 A1*  8/2009  Kullberg et al. ................ 502/56

FOREIGN PATENT DOCUMENTS

| WO | 2006/089068 | 8/2006 |
| WO | 2007/066372 | 6/2007 |
| WO | 2007/080614 | 7/2007 |
| WO | 2008/033560 | 3/2008 |
| WO | 2008/148778 | 12/2008 |
| WO | 2008/148781 | 12/2008 |

OTHER PUBLICATIONS

PCT International Preliminary Report on Patentability of PCT/EP2010/056872 filed on May 19, 2010 in the name of Saes Getters S.p.A.
PCT International Search Report of PCT/EP2010/056872 filed on May 19, 2010 in the name of Saes Getters S.p.A.
PCT Written Opinion of PCT/EP2010/056872 filed on May 19, 2010 in the name of Saes Getters S.p.A.

* cited by examiner

*Primary Examiner* — Eric Thomas
(74) *Attorney, Agent, or Firm* — Steinfl & Bruno LLP

(57) ABSTRACT

A multilayer composite getter, a method for its manufacturing and electrochemical devices for energy storage employing said multilayer composite getters are described.

20 Claims, 2 Drawing Sheets

MULTILAYER COMPOSITE GETTER

CROSS REFERENCE TO RELATED APPLICATIONS

The present application is the US national stage of International Application PCT/EP2010/056872 filed on May 19, 2010, which, in turn, claims priority to Italian Patent Application MI2009A000917 filed on May 25, 2009.

FIELD

The present invention relates to a multilayer composite getter, a method for its manufacturing and to electrochemical devices for energy storage that employ said multilayer composite getters.

BACKGROUND

The use of getter materials for the removal of gaseous impurities has found application in many fields, such as process chambers for semiconductor devices, purification of process gases and pumping members for evacuated chambers. However, one of the fields in which the use of getter materials is particularly appreciated I that of the removal of harmful species from the internal volume of hermetic or sealed devices, where the presence of these harmful species jeopardizes the operation of the device.

In this case, the mechanisms that compromise the functionality of the device are essentially of two types, the first one of which is due to a chemical interaction of the harmful species with one or more components of the device, which interaction alters the properties of said components thus jeopardizing their functionality. Examples of these interactions may be, among others, some loss of transparency for optical devices or a degradation of the electrical characteristics of the components by altering their resistivity and thus their functionality. In this first case it is very important that the concentration of harmful species, typically in the form of gases, is as low as possible.

A second degradation mechanism is instead associated with the risks of breaking the device due to an excessive pressurization; this problem is present in the devices in which the harmful species are mainly in a gaseous form and their production is associated with the operation of the device itself. In this case risks of mechanical breakage of the container, and thus also safety problems, are associated with a malfunction of the device.

This problem is particularly felt in the field of electrochemical devices for energy storage, nowadays generally known as energy storage devices.

In the wide range and variety of electrochemical devices for energy storage two very important large families may be identified: electrolytic capacitors, with particular reference to those known in the field as "aluminum capacitors" and "supercapacitors". In the technical field, the main difference between these categories of devices resides in the different order of magnitude of the accumulated capacity. In particular, in the case of electrolytic capacitors of small size the capacity is in the order of microfarad (µF), whereas in the case of supercapacitors the capacity may also be 10,000 times higher.

The problem of the presence of gaseous impurities within these devices has been tackled in various ways. For example patent applications WO 2007/066372 and WO 2008/148778, both in the applicant's name, employed polymeric multilayer systems with the getter material dispersed in a suitable polymer and shielded from the contact and the interaction with the electrolyte by means of a protective polymeric layer permeable to the harmful species but impermeable to the electrolyte.

Another solution, described in patent applications WO 2007/080614 and WO 2008/148781, both in the applicant's name, teaches the use of getter materials enclosed in a polymeric container permeable to the harmful species but impermeable to the electrolyte.

Finally, patent application WO 2008/033560, also in the applicant's name, exploits a completely different approach and describes the use of metal getter multilayers for removing hydrogen from electrochemical devices for energy storage, with particular reference to the use of materials comprising an external layer made of a noble metal. In such application it is envisioned the possibility to use the material in powder form within suitable polymeric containers that has no other technical function than retaining the material within the container, since those material were described as compatible with the electrolytic environment of the energy storage device.

The latter solution seems, and is so considered in the field, better than the previous ones with reference to the removal of $H_2$ because the use of polymeric multilayers necessarily limits the amount of getter material contained therein, due to the very nature of a polymeric layer; so, on equal volume occupied by the getter material, results in a lower capacity. The solutions in which the getter material is enclosed in a polymeric container have proved to be inherently fragile, in particular in the connection areas of the container. In addition to these problems there is also the fact that in the first two solutions the presence of the polymeric layer generally slows down hydrogen sorption, whereas the multilayer metal getter, which is described as such in patent application WO 2006/089068 in the applicant's name, has characteristics that were considered to make it compatible with the application.

In particular, although the solution described in WO 2008/033560 is very effective in the removal of hydrogen under normal conditions of use within electrochemical devices for energy storage, it has surprisingly shown unexpected drawbacks under some particular use conditions in which the materials intended to remove hydrogen became themselves gas sources, thus leading to the device breakage.

The main condition leading to this reverse behaviour is the presence of a flow of current having reversed polarity with respect to the normal operation. This situation may result from a human error during the connection and installation of the device, with a significant associated safety risk due to the large amounts of gas that may be generated in a short time, or when the inner temperature of the device exceeds the nominal temperature of the capacitor (which is typically defined in the field as "rated temperature" of the device), since in this case secondary alternating currents are generated (defined in the field as "ripple currents"), whose inverse component is the one which is harmful for the device. More references and details can be found in various publications such as the book Electronic Fundamentals & Applications, published in 1970. The intensity of the phenomenon, and thus the associated gas generation, is directly proportional to temperature: in particular this starts to be significant when the temperature of the device exceeds the specified rated temperature by 5%.

SUMMARY

It is an object of the present invention to overcome the drawbacks still present in the prior art with reference to the use of multi-layer metal getter materials in electrochemical devices for energy storage. In a first aspect thereof the invention is an electrochemical device including a multilayer composite getter for hydrogen removal comprising a support essentially formed of a metal getter material with two sides, wherein a layer of palladium or palladium based composites is provided on at least one of said sides, defining a coated side, wherein a hydrogen-permeable protective polymeric layer is provided on at least 80% of the surface on the palladium or palladium based composites coated side of the support, characterized in that the thickness of said protective polymeric hydrogen-permeable layer is comprised in the range of 1 to 10 µm.

With palladium based composites it is intended composites containing at least 60% wt of palladium. Preferred palladium composites are palladium-vanadium, palladium-nickel compounds and even more preferred is the use of palladium-copper or palladium-silver compounds. In an even more preferred embodiment the palladium compounds are in form of a palladium alloy.

BRIEF DESCRIPTION OF THE DRAWINGS

The invention will be better described in the following with reference to the drawings, wherein.

Figure 1:
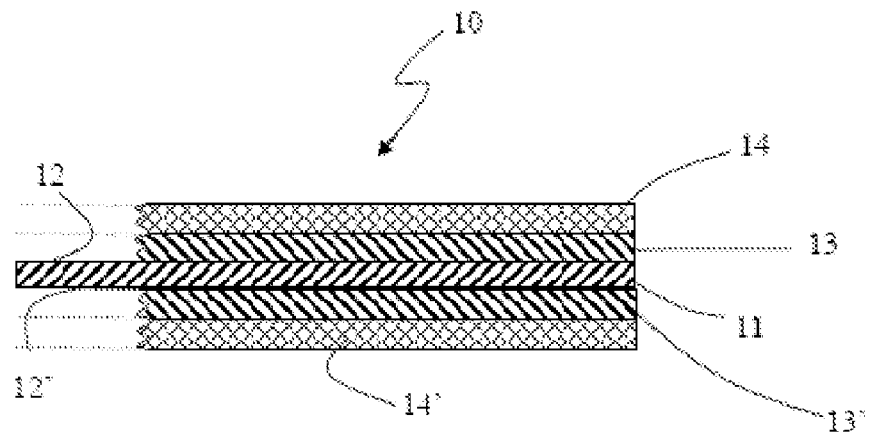
FIG. 1 shows a broken view of a multi-layer composite getter to be used in an electrochemical device for energy storage according to the present invention.

In the drawings the size and dimensional ratios of some components, with particular but non exclusive reference to the thicknesses of the layers forming the multi-layer composite getter, have been altered in order not to compromise the reading of the drawings.

DETAILED DESCRIPTION

FIG. 1 shows a multi-layer composite getter 10 made according to the present invention, wherein on both the available surfaces 12, 12' of the layer 11 made of metal getter a layer 13, 13' of palladium or palladium based composite is arranged and a protective layer 14, 14' of a hydrogen-permeable polymeric material is arranged on the latter.

The metal getter layer 11 serves as a supporting member for the other layers and, although the preferred embodiment is the one shown in FIG. 1, in some embodiments it is possible that the layer of palladium or palladium based composite is not present along the whole surface of the getter layer. In this case it is important that the palladium or palladium based composite cover at least 20% of the available surface of the metal getter layer.

Of critical importance is the fact that the polymeric layer shall cover at least 80% of the overall metallic surface, intended as uncoated surface of the supporting metal getter layer and surface of the palladium or palladium based composites coating.

Figure 2:
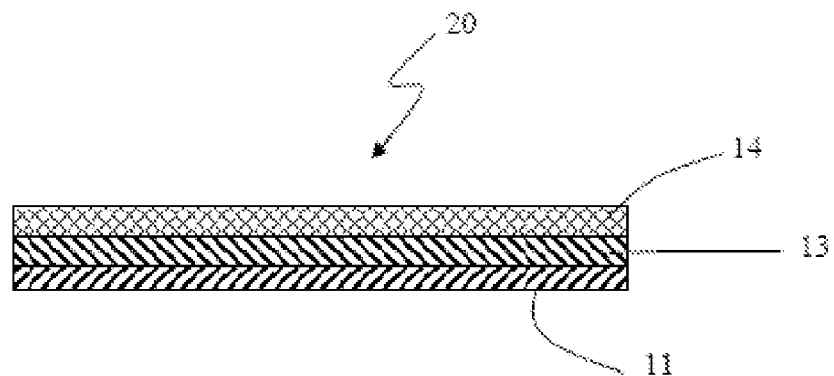
FIG. 2 shows an alternative embodiment of a multi-layer composite getter to be used in an electrochemical device for energy storage according to the present invention.

An alternative embodiment is shown in FIG. 2. In this case the layer 13 made of palladium or palladium based composites with the polymeric material layer 14 lying thereon is provided on only one of the surfaces of the supporting getter layer 11. The same considerations previously described with reference to the possible reduced surface of the layer of palladium or palladium based composites also apply to this case. In this case it is preferred to have the external polymeric layer present, for at least 80% of the available surface, so only on the palladium or palladium based composites coated side of the composite getter, since this type of embodiment is useful when the composite getter is placed against a wall of a device, so with in this case one of the surfaces will be inactive and shielded from the environment where the composite getter is used, so it will not be necessary its coating with the noble metal or noble metal composite, such as a noble metal alloy, and the external polymeric layer.

Figure 3:
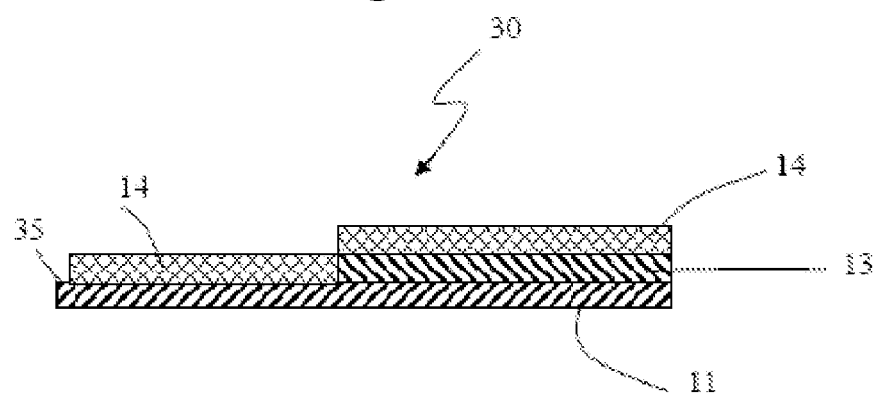
FIG. 3 shows a third embodiment of a multi-layer composite getter to be used in an electrochemical device for energy storage according to the present invention.

A further variation of this embodiment is shown in FIG. 3, where in this case it is explicitly shown that a small part 35 of the available metallic surface, in this specific case of the supporting metallic getter layer, is not covered by the polymeric layer 14.

In the present invention it is important that the polymeric material layer coats at least 80% of the metallic surface exposed to the inner atmosphere of the device where the multilayer getter system is installed; preferably said polymeric layer exhibiting a permeability to hydrogen equal or higher than $10^{-12}$ cm$^3$ cm cm$^{-2}$ s$^{-1}$Pa$^{-1}$ at 25° C.

Among the polymeric materials that can be advantageously used for the layer of protective hydrogen-permeable polymeric material, there are: polyxylenes, with particular reference to parylene, polystyrenes, polyalkanes, polydienes with particular reference to polymethyl-1-pentenylene, polyoxides, polysiloxanes with particular reference to polyoxydimethylsilylene, polymethyloctylsiloxane, polydimethylsiloxane. Among all the previous materials preferred is the use of polydimethylsiloxane.

As getter materials suitable for the manufacturing of the supporting layer 11 zirconium, yttrium or titanium may be used, among which preferred is the use of titanium. These metals may also contain small amounts of other metal elements that do not significantly alter the characteristics of the supporting layer; typically, the level of these other metals must not exceed the 20% by weight.

In a preferred embodiment the palladium or palladium based composites directly coats the getter support surface and therefore is in direct contact with the getter support.

In an alternate embodiment it is also envisioned the presence of a metallic layer interposed between the getter support and the palladium or palladium based composite. The purpose of this layer is to enhance the palladium or palladium based composite adhesion to the getter support, especially when electrochemical deposition processes for the palladium or palladium based composites are used. Such layer is preferably made by metals such as Ni, Cu, Pt, and typically has a thickness equal or lower than 20 nm.

As to the thickness of the layers of the multi-layer composite getter, the thickness of the getter material layer may be comprised between 20 and 500 micron (µm), preferably between 100 and 300 micron and, as with regards to the layer of palladium or palladium based composites, between 10 and 2,000 nanometers (nm) and preferably between 20 and 250 nanometers.

As to the thickness of the layers of the external layer made of polymeric material, this must be comprised between 1 and 100 µm in order not to compromise the sorption speed of hydrogen by the multi-layer composite getter and to ensure the absence of large uncoated areas that might lead to the generation of hydrogen under anomalous operation conditions, i.e. in the presence of currents having reversed polarity. In particular the above thicknesses ensure that the coated areas do not become possible hydrogen sources, so the only minimal hydrogen sources due to the presence of the composite getter may be given only by the uncoated areas, and such generated hydrogen will also be quickly re-absorbed by the polymeric coated portions.

In a second aspect thereof the invention relates to a method for the manufacturing of a multi-layer composite getter according to the present invention, wherein the second hydrogen-permeable polymeric layer is deposited by spin coating, spray coating, blading, vacuum deposition, dip coating or screen printing.

In general, different techniques may be employed in order to deposit the second polymeric layer on the metallic elements of the composite getter, being said metals either the metal of the support, or the second layer of palladium or palladium based composites. The important aspect associated with these techniques is that they can ensure a sufficient uniformity and regularity of the polymeric layer, in addition to ensure a sufficient adhesion between the second layer, formed of palladium or palladium based composites and the polymeric layer.

Spin coating, spray coating, blading, vacuum deposition, dip coating and screen printing techniques are among the most suitable techniques for the manufacturing of polymeric deposits having the required characteristics. These techniques are not described here because they are widely known by those skilled in the art.

As to the process for the formation of the intermediate layer made of palladium or palladium based composites, particularly advantageous processes are sputtering, thermal evaporation or evaporation by electron beam, electrochemical deposition processes or, alternatively, chemical deposition processes known in the field as "electroless", which do not require the passage of current, or processes that employ special inks containing palladium or palladium based composites in solution.

In a third aspect thereof the invention relates to an electrochemical device for energy storage that contains an electrolyte and a multi-layer composite getter according to the present invention.

In this case the protective polymeric layer must be insoluble in the electrolytic solvent and impermeable to the electrolyte and its components.

In a preferred embodiment the permeability to hydrogen of the polymeric layer must be of at least one order of magnitude higher than the permeability to the electrolyte or to its components.

Particularly interesting devices among the electrochemical devices for energy storage are electrolytic capacitors, with particular reference to "aluminum capacitors" and supercapacitors.

In this case, in order to manufacture the second protective layer it is advantageous to use polymeric materials having hydrophobic characteristics, i.e. characterized by having a surface functionalization with non-polar groups that can repel water and polar compounds.

Moreover, in this specific application is very advantageous the use of polydimethylsiloxane.

Figure 4:
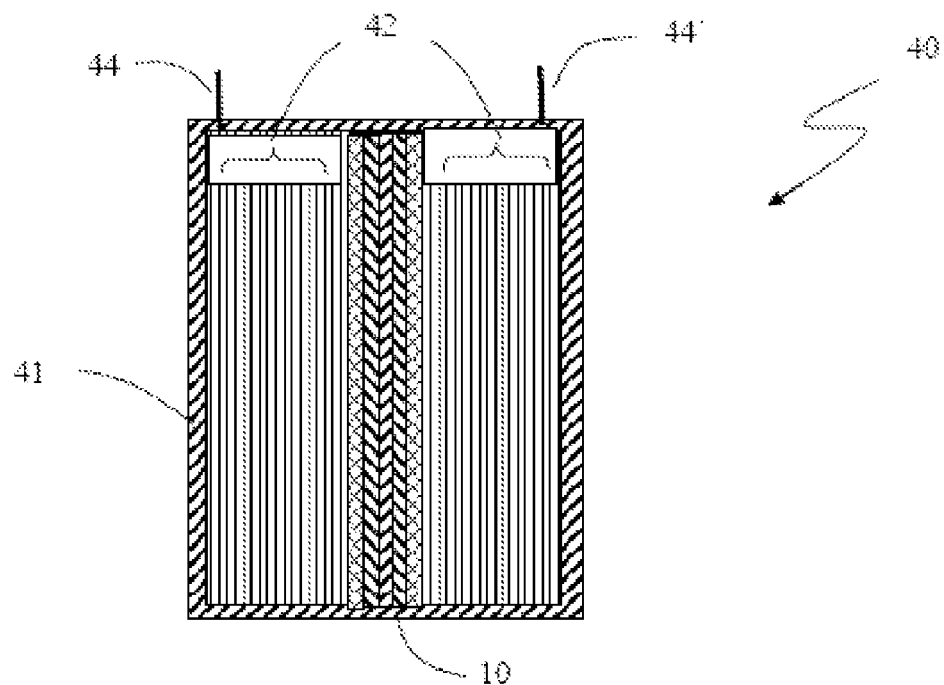
FIG. 4 shows a first embodiment of an electrochemical device for energy storage according to the present invention.

FIG. 4 shows a first way to use a multi-layer composite getter 10 within an electrochemical device 40 for energy storage comprising a hermetic container 41 whose electrodes are in the form of thin sheets wound to form a spiral 42, whose sectional view is represented by close vertical parallel lines, immersed in a liquid electrolyte (not shown). The electrical contacts 44, 44' connect the electrodes with the outside of the hermetic container. The multi-layer composite getter 10 is arranged in the central portion of this capacitor. The electrochemical device shown in FIG. 4 has a cylindrical geometry, but this geometry is not binding for the manufacturing of the invention. For example, parallelepiped is another preferred geometric shape for these capacitors having the means for sorbing impurities according to the present invention placed in the central portion of the device.

Figure 5:
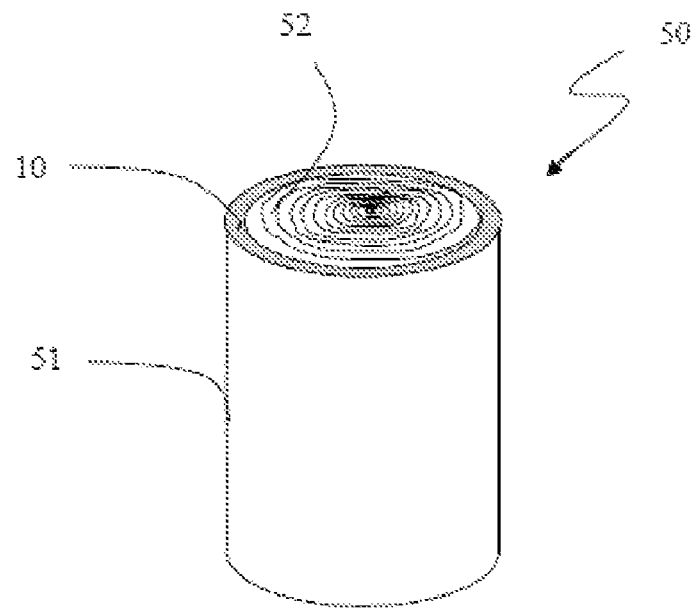
FIG. 5 shows a second embodiment of an electrochemical device for energy storage according to the present invention.

FIG. 5 shows a second embodiment of an electrochemical device 50 for energy storage. In this case the structure of the device 50 comprises wound electrodes forming a spiral 52 and immersed in an electrolytic solution (not shown). A multi-layer composite getter according to the present invention is arranged on one side of this capacitor.

In the embodiment of FIG. 4 the multi-layer composite getter is arranged along the whole inner edge of the device, but in a more general embodiment it may be also arranged only along a portion of the device.

Moreover, in some particular cases the devices may contain more composite getter members according to the present invention. For example, these may be present both in the central portion and in the inner periphery of the device.

The invention claimed is:

1. An electrochemical device for energy storage containing a solvent,
an electrolyte and
a multilayer composite getter for hydrogen removal, said multilayer composite getter comprising
a support essentially formed of a metal getter material with two sides,
a layer of palladium or palladium based composites provided on at least one of said sides, defining a coated side, and
a hydrogen-permeable protective polymeric layer provided on at least 80% of the surface on the palladium or palladium based composites coated side of the support, wherein the thickness of said protective polymeric hydrogen-permeable layer is comprised in the range of 1 to 100 µm.

2. The electrochemical device according to claim 1, wherein said palladium or palladium based composite is in direct contact with the support.

3. The electrochemical device according to claim 1, further comprising a metallic layer disposed between the support and the palladium or palladium based composite layer.

4. The electrochemical device according to claim 1, wherein both of said sides of the support are provided with said layer of palladium or palladium based composites.

5. The electrochemical device according to claim 1, wherein only one of said sides of the support is provided with said layer of palladium or palladium based composites.

6. The electrochemical device according to claim 1, wherein only a portion of the sides of the support is coated with the layer of palladium or palladium based composites.

7. The electrochemical device according to claim 6, wherein said portion coated with palladium or palladium based composites is at least 20% of the support.

8. The electrochemical device according to claim 1, wherein hydrogen-permeability of the protective polymeric layer is higher or equal to $10^{-12} cm^3 cm\ cm^{-2} S^{-1} Pa^{-1}$.

9. The electrochemical device according to claim 1, wherein said hydrogen-permeable protective polymeric layer is selected from the group consisting of:
polyxylenes, polystyrenes, polyalkanes, polydienes, polyoxides, polysiloxanes.

10. The electrochemical device according to claim 9, wherein said hydrogen-permeable protective polymeric layer is selected from the group consisting of:

parylene, polystyrenes, polymethyl-1-pentenylene, polyoxydimethylsilylene, polymethyloctylsiloxane, and polydimethylsiloxane.

11. The electrochemical device according to claim 1, wherein said support is essentially formed of a metal selected from the group consisting of zirconium, yttrium, and titanium.

12. The electrochemical device according to claim 1, wherein said palladium based composites are Pd—Ag, Pd—Cu, Pd—V, or Pd—Ni.

13. The electrochemical device according to claim 1, wherein the thickness of said support essentially formed of a metal getter material is comprised in the range of 20 to 500 µm.

14. The electrochemical device according to claim 1, wherein the thickness of said layer of palladium or palladium based composites is comprised in the range of 10 to 2000 nm.

15. The electrochemical device according to claim 1, wherein said polymeric layer is insoluble in the solvent and impermeable with respect to the electrolyte and with respect to the electrolyte components.

16. The electrochemical device according to claim 15, wherein said polymeric layer is hydrophobic.

17. The electrochemical device according to claim 16, wherein said polymeric layer has a hydrogen permeability which is higher by at least one magnitude order with respect to the permeability to the electrolyte or the components thereof.

18. The electrochemical device according to claim 1, wherein said polymeric layer is made of polydimethylsiloxane.

19. The electrochemical device according to claim 1, wherein said multilayer composite getter is arranged in the central portion of the device, along the perimeter, or along a portion of the perimeter of the device.

20. The electrochemical device according to claim 1, wherein said device is a supercapacitor, or an electrolytic capacitor.

* * * * *